United States Patent
Shi et al.

(10) Patent No.: US 12,512,833 B2
(45) Date of Patent: Dec. 30, 2025

(54) SOLID-STATE CIRCUIT BREAKER AND CONTROL METHOD THEREFOR

(71) Applicant: Schneider Electric Industries SAS, Rueil-Malmaison (FR)

(72) Inventors: Ying Shi, Shanghai (CN); Jihua Dong, Shanghai (CN); Jiangang Chen, Shanghai (CN)

(73) Assignee: Schneider Electric Industries SAS, Rueil-Malmaison (FR)

(*) Notice: Subject to any disclaimer, the term of this patent is extended or adjusted under 35 U.S.C. 154(b) by 16 days.

(21) Appl. No.: 18/699,636

(22) PCT Filed: Oct. 8, 2022

(86) PCT No.: PCT/CN2022/123848
§ 371 (c)(1),
(2) Date: Apr. 9, 2024

(87) PCT Pub. No.: WO2023/056944
PCT Pub. Date: Apr. 13, 2023

(65) Prior Publication Data
US 2024/0372546 A1    Nov. 7, 2024

(30) Foreign Application Priority Data
Oct. 9, 2021  (CN) .......................... 202111174453.2

(51) Int. Cl.
*H03K 17/00* (2006.01)
*G01R 19/02* (2006.01)
(Continued)

(52) U.S. Cl.
CPC .............. *H03K 17/56* (2013.01); *G01R 19/02* (2013.01); *G01R 19/16576* (2013.01)

(58) Field of Classification Search
CPC . H03K 17/56; H02H 3/38; H02H 3/08; G01R 19/02; G01R 19/16576
See application file for complete search history.

(56) References Cited

U.S. PATENT DOCUMENTS 5,216,352 A * 6/1993 Studtmann ........... H02H 3/0935
323/239
11,349,297 B2 * 5/2022 Telefus ................ H02H 1/0015
(Continued)

OTHER PUBLICATIONS

Supplementary European Search Report for Application 22877959.1 dated Sep. 10, 2025, 6 pages.

*Primary Examiner* — Tuan T Lam
(74) *Attorney, Agent, or Firm* — Patterson + Sheridan, LLP (57) ABSTRACT

The present disclosure relates to a solid-state circuit breaker and a control method therefor. The solid-state circuit breaker comprises a solid-state switch, a first measurement unit, a second measurement unit, a control unit, and a driving unit. The first measurement unit is used to measure the current and/or voltage at a first terminal of the solid-state switch. The second measurement unit is used to measure the current and/or voltage at a second terminal of the solid-state switch. The control unit is used to: when the solid-state switch is turned off, determine whether the first terminal is charged; determine whether the second terminal is charged; control the driving unit to input a pulse voltage to a control terminal of the solid-state switch; and after the pulse duration has ended, determine the type of load.

20 Claims, 3 Drawing Sheets

(51) Int. Cl.
    *G01R 19/165*     (2006.01)
    *H03K 17/56*     (2006.01)

(56) References Cited

U.S. PATENT DOCUMENTS

| | | | |
|---|---|---|---|
| 2018/0217658 A1 | 8/2018 | Bruhn, Jr. et al. | |
| 2020/0266624 A1 | 8/2020 | Zhou et al. | |
| 2020/0365346 A1* | 11/2020 | Telefus | H02M 1/32 |
| 2024/0088642 A1* | 3/2024 | Zhou | H02H 3/04 |
| 2024/0421689 A1* | 12/2024 | Telefus | H02H 3/08 |
| 2025/0035712 A1* | 1/2025 | Arimura | H02J 1/00 |

\* cited by examiner

SOLID-STATE CIRCUIT BREAKER AND CONTROL METHOD THEREFOR

TECHNICAL FIELD

The present disclosure relates to a solid-state circuit breaker and a control method therefor.

BACKGROUND

Solid-state circuit breaker is a new type of circuit breaker in power distribution systems. The solid-state circuit breaker replaces part of the mechanical structure with power electronic devices, a solid-state switch therein is a power electronic switch (e.g. Insulated Gate Bipolar Transistor, IGBT), giving the solid-state circuit breaker many advantages that conventional circuit breakers do not have. For example, closing and opening speed of the solid-state circuit breaker is much faster than that of a mechanical circuit breaker, making it possible to limit the fault current quickly. In the meanwhile, the control of the solid-state circuit breaker is more precise than the mechanical circuit breaker, thereby providing more rapid and precise protection for subsequent power distribution equipment. In addition, the natural digital nature of the solid-state circuit breaker makes it possible to realize some complex application control and protection logic.

SUMMARY

The present disclosure relates to a solid-state circuit breaker and a control method therefor. By measuring current and/or voltage at a power intake terminal and a load terminal of the solid-state circuit breaker, and turning on and off the solid-state switch in the solid-state circuit breaker using a pulse voltage, a type of a load connected to the solid-state circuit breaker can be determined, thereby providing a basis for further avoiding potential improper application of the solid-state circuit breaker and determining an appropriate closing strategy for the solid-state circuit breaker.

According to a first aspect of the present disclosure, a solid-state circuit breaker is provided. The solid-state circuit breaker comprises a solid-state switch, a first measurement unit, a second measurement unit, a control unit, and a driving unit. The solid-state switch is connected between a power intake terminal of the solid-state circuit breaker and a load terminal of the solid-state circuit breaker, wherein a first terminal of the solid-state switch is connected to the load terminal and the first measurement unit, a second terminal of the solid-state switch is connected to the power intake terminal and the second measurement unit, and a control terminal of the solid-state switch is connected to the driving unit. The first measurement unit is configured to measure a current and/or voltage at the first terminal of the solid-state switch. The second measurement unit is configured to measure a current and/or voltage at the second terminal of the solid-state switch. The control unit is configured to: determine whether the first terminal is charged based on the current and/or voltage at the first terminal in a case that the solid-state switch is turned off; determine whether the second terminal is charged based on the current and/or voltage at the second terminal in response to determining that the first terminal is not charged; control the driving unit to input a pulse voltage to the control terminal of the solid-state switch to turn on the solid-state switch for a corresponding pulse duration in response to determining that the second terminal is charged; and determine a type of a load connected to the first terminal of the solid-state switch based on a changing pattern of the current at the first terminal or a changing pattern of the voltage at the first terminal after the pulse duration ends.

According to a second aspect of the present disclosure, a control method of a solid-state circuit breaker is provided. The solid-state circuit breaker comprises a solid-state switch connected at a first terminal thereof to a load terminal of the solid-state circuit breaker and connected at a second terminal thereof to a power intake terminal of the solid-state circuit breaker. The control method comprises: measuring a current and/or voltage at the first terminal of the solid-state switch; measuring a current and/or voltage at the second terminal of the solid-state switch; determining whether the first terminal is charged based on the current and/or voltage at the first terminal in a case that the solid-state switch is turned off; in response to determining that the first terminal is not charged, determining whether the second terminal is charged based on the current and/or voltage at the second terminal; in response to determining that the second terminal is charged, inputting a pulse voltage to a control terminal of the solid-state switch to turn on the solid-state switch for a corresponding pulse duration; and determining a type of a load connected to the first terminal of the solid-state switch based on a changing pattern of the current at the first terminal or a changing pattern of the voltage at the first terminal after the pulse duration ends.

BRIEF DESCRIPTION OF DRAWINGS

The aspects, features, and advantages of the present disclosure will become clearer and easier to understand from the following description of embodiments taken in conjunction with the accompanying drawings, in which.

DETAILED DESCRIPTION

The detailed description of the present disclosure will be made below with reference to exemplary embodiments of the present disclosure. However, the present disclosure is not limited to the embodiments described herein, but may be embodied in many different forms. The described embodiments are merely intended to make the present disclosure thorough and complete, and to fully convey the concept of the present disclosure to those skilled in the art. Features of the various embodiments described may be combined with or substituted for each other, unless explicitly excluded or should be excluded from the context.

Currently, solid-state circuit breakers are unable to determine the type of a load to which they are connected, thereby failing to alert for potential safety risks, such as reverse intake powering, bus-tie switch applications, closing of large capacitors without discharging, and the like. Furthermore, at the moment the circuit breaker is closed, the load is powered on, and for capacitive loads (e.g., capacitors), a surge current is typically generated in the circuit, while for inductive loads (e.g., transformers), an inrush current is typically generated in the circuit. Since the current solid-state circuit breakers cannot determine the type of a load to which they are connected, it is not possible to adopt an appropriate closing strategy for a particular load type to avoid the above-mentioned surge current or inrush current.

Embodiments of the present disclosure propose a solid-state circuit breaker and a control method therefor. By measuring current and/or voltage at a power intake terminal and a load terminal of the solid-state circuit breaker, and turning on and off the solid-state switch in the solid-state circuit breaker using a pulse voltage, a type of a load connected to the solid-state circuit breaker can be determined, thereby providing a basis for further avoiding potential improper application of the solid-state circuit breaker and determining an appropriate closing strategy for the solid-state circuit breaker.

Figure 1:
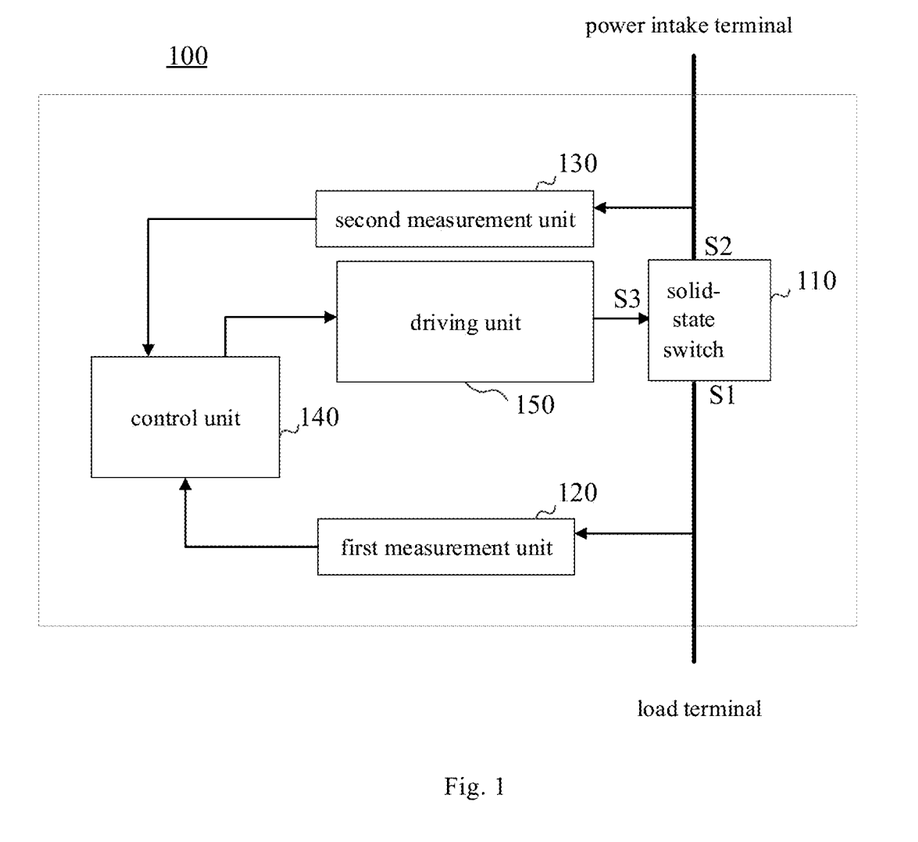
FIG. 1 is a schematic diagram of a solid-state circuit breaker according to an embodiment of the present disclosure.

FIG. 1 is a schematic diagram of a solid-state circuit breaker 100 according to an embodiment of the present disclosure. The solid-state circuit breaker 100 may comprise a solid-state switch 110, a first measurement unit 120, a second measurement unit 130, a control unit 140, and a driving unit 150. As shown in FIG. 1, the solid-state switch 110 may be connected between a power intake terminal of the solid-state circuit breaker 100 and a load terminal of the solid-state circuit breaker 100. A first terminal S1 of the solid-state switch 110 is connected to the load terminal and the first measurement unit 120, a second terminal S2 of the solid-state switch 110 is connected to the power intake terminal and the second measurement unit 130, and a control terminal S3 of the solid-state switch 110 is connected to the driving unit 150. The power intake terminal may be connected to an AC power source. The turning on and off of the solid-state switch 110 may cause the load terminal to be connected and disconnected from the power intake terminal respectively, thereby powering on or powering off the load to which the load terminal is connected.

The first measurement unit 120 may be connected between the first terminal S1 of the solid-state switch 110 and control unit 140, measure the current and/or voltage at the first terminal S1 of the solid-state switch 110 and send the measurements to the control unit 140. The second measurement unit 130 may be connected between the second terminal S2 of the solid-state switch 110 and the control unit 140, measure the current and/or voltage at the second terminal S2 of the solid-state switch 110 and send the measurements to control unit 140.

The principle by which the solid-state circuit breaker 100 of the present disclosure determines the type of a load to which it is connected is as follows. In a case that the solid-state switch 110 is turned off, the load terminal is not charged, and the power intake terminal is charged, turning on the solid-state switch 110 for a pulse duration so that the load to which it is connected can be charged (i.e., applied with voltage or current). Then, after the pulse duration ends, the type of the load is determined based on the discharge condition of the load. It will be described in detail below how the above principles are implemented by the cooperation of the various components of the solid-state circuit breaker 100.

Firstly, in the case that the solid-state switch is turned off, the control unit 140 may determine whether the first terminal S1 is charged, i.e., determine whether the load terminal is charged, based on the current and/or voltage at the first terminal S1 measured by the first measurement unit 120. For example, the control unit 140 may determine whether the first terminal S1 is charged or not based on a comparison of various statistical values capable of characterizing the current and/or voltage at the first terminal S1 with a current and/or voltage threshold. These statistical values may be, for example, root mean square (RMS) values of the current and/or voltage, peak-to-peak values, and the like. In one embodiment, the control unit 140 may determine whether the first terminal S1 is charged based on a RMS value of the voltage at the first terminal S1. Specifically, a first voltage RMS value may be calculated based on the measured voltage at the first terminal S1, and the calculated first voltage RMS value may be compared with a first voltage threshold. The first voltage threshold is a voltage threshold characterizing whether the first terminal S1 is charged or not, and may be a predetermined default value or input by a user. If the calculated first voltage RMS value is less than a first voltage threshold, it may be determined that the first terminal S1 is not charged; If the calculated first voltage RMS value is greater than or equal to the first voltage threshold, it may be determined that the first terminal S1 is charged.

If it is determined that the first terminal S1 is not charged, the control unit 140 may further determine whether the second terminal S2 is charged or not, i.e., determine whether the power intake terminal is charged or not, based on the current and/or voltage at the second terminal S2 measured by the second measurement unit 130. Whether the second terminal S2 is charged or not may be determined in a manner similar to the above-described manner of determining whether the first terminal S1 is charged or not. For example, the control unit 140 may determine whether the second terminal S2 is charged or not based on a comparison of various statistical values capable of characterizing the current and/or voltage at the second terminal S2 with a current and/or voltage threshold. These statistical values may be, for example, RMS values of the current and/or voltage, peak-to-peak values, and the like. In one embodiment, the control unit 140 may determine whether the second terminal S2 is charged based on a RMS value of the voltage at the second terminal S2. Specifically, a second voltage RMS value may be calculated based on the measured voltage at the second terminal S2, and the calculated second voltage RMS value may be compared with a second voltage threshold. The second voltage threshold is a voltage threshold characterizing whether the second terminal S2 is charged or not, and may be a predetermined default value or input by a user. If the calculated second voltage RMS value is greater than the second voltage threshold, it may be determined that the second terminal S2 is charged; If the calculated second voltage RMS value is less than or equal to the second voltage threshold, it may be determined that the second terminal S2 is not charged. In a case where it is determined that the second terminal S2 is not charged, it may be determined that the main loop of the solid-state circuit breaker is not powered or in an undervoltage state, the control unit 140 may inform the user of this situation so that the user may take corresponding corrective measures.

If it is determined that the first terminal S1 is not charged and the second terminal S2 is charged, then the above-described condition of "solid-state switch 110 is turned off, power intake terminal is charged, and load terminal is not charged" is satisfied, then the solid-state switch 110 needs to be turned on for a certain pulse duration so that the load to which it is connected can be charged. For example, control unit 140 may control driving unit 150 to input a pulse voltage to control terminal S3 of the solid-state switch 110 to turn on solid-state switch 110 for a corresponding pulse duration, whereby power from the power intake terminal may temporarily charge the load to which the load terminal is connected. In one embodiment, in order to avoid generating a large current or reverse voltage at the instant when the solid-state switch 110 is turned on, which may damage the solid-state switch and the load, the control unit 140 may control the driving unit 150 to start inputting the pulse voltage at a point where the voltage at the second terminal S2 crosses zero. Furthermore, in one embodiment, in order to reduce the impact on the solid-state switch and the load, a turning on mode with "small pulse" is employed, e.g., the inputted pulse voltage is a short pulse voltage having a duration of less than 1 millisecond.

In order to fully charge the load so that the type of the load can subsequently be determined based on the discharge condition of the load, the current at the first terminal S1 of the solid-state switch 110 can be monitored during the turning on of the solid-state switch 110. In one embodiment, during the turning on of the solid-state switch 110, control unit 140 may compare a peak value of the current at the first terminal S1 of the solid-state switch 110 with a first current detection threshold. The first current detection threshold is a current threshold representative of a current value which can charge the load, during turning on of the solid-state switch 110, to a state such that the type of the load to which the first terminal S1 is connected can be determined based on a changing pattern of the current or voltage at the first terminal S1 following turning off of the solid-state switch 110, and may be a predetermined default value or input by a user. If the peak value of the current at the first terminal S1 is smaller than the first current detection threshold, it may be determined that it is not sufficient to charge the load to the above-described state, and the control unit 140 may then control the driving unit 150 to increase the duration of the above-described pulse voltage or input a plurality of the above-described pulse voltages, thereby enabling the load to be charged to the above-described state for subsequent determination. Furthermore, in one embodiment, in order to avoid the instantaneous current during turning on of the solid-state switch 110 being too large and thus damaging the solid-state switch and the load, control unit 140 may further compare the instantaneous value of the current at the first terminal S1 during turning on of the solid-state switch 110 with a second current detection threshold, and control the driving unit 150 to stop inputting the above-mentioned pulse voltage if the instantaneous value of the current at the first terminal S1 is greater than the second current detection threshold. The second current detection threshold is a current threshold that characterizes whether the instantaneous current at the load terminal is too large and thus may damage the solid-state switch and the load, and may be a predetermined default value or input by a user.

At the end of the above pulse duration, the solid-state switch 110 changes from the turning on state to the turning off state, and the charged load begins to discharge, thereby allowing the type of load to be determined based on the discharge of the load. In the circuit, an inductive load has the characteristic of preventing the current across both ends thereof from changing, while a capacitive load has the characteristic of preventing the voltage across both ends thereof from changing. Accordingly, the control unit 140 may determine the type of the load to which the first terminal S1 is connected based on the changing pattern of the current at the first terminal S1 or the changing pattern of the voltage at the first terminal S1.

Figure 2:
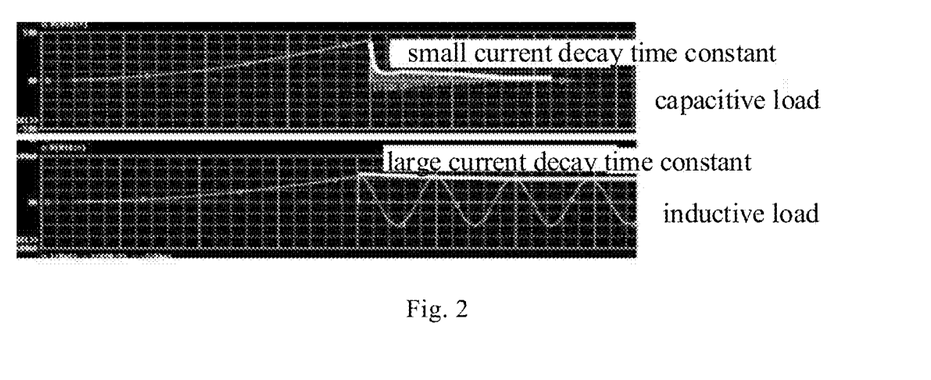
FIG. 2 shows simulated waveforms of a current at a load terminal when a load to which a solid-state circuit breaker is connected is an inductive load and a capacitive load, respectively.

Since the inductive load has the characteristic of preventing the current across both ends thereof from changing, the current at the load terminal decays relatively slowly during discharge of the inductive load and relatively quickly during discharge of the capacitive load and the resistive load. FIG. 2 shows simulated waveforms of a current at a load terminal when a load to which a solid-state circuit breaker is connected is an inductive load and a capacitive load, respectively. As a result, the control unit 140 may determine the type of the load to which the first terminal S1 is connected based on the above-described difference in the decay speed of the current at the load terminal. Specifically, in one embodiment, after the above-mentioned pulse duration ends, the control unit 140 may calculate a current decay time constant based on the current at the first terminal S1 and compare it with a current decay time threshold. If the calculated current decay time constant is greater than the current decay time threshold, control unit 140 may determine that the load to which the first terminal S1 of the solid-state switch 110 is connected is an inductive load. Conversely, if the calculated current decay time constant is less than or equal to the current decay time threshold, control unit 140 may determine that the load to which the first terminal S1 of the solid-state switch 110 is connected is a capacitive load or a resistive load. The above-mentioned current decay time threshold is a time threshold for distinguishing between the current decay time of an inductive load and a capacitive/resistive load, and may be a predetermined default value or input by a user. The current decay time constant described above is a parameter that characterizes how fast or slow the current decays. In one embodiment, the current decay time constant may be the time for the peak value of the current at the first terminal S1 to decay from a first current peak value to a second current peak value. The first current peak value corresponds to the maximum peak value of the current at the first terminal S1 after the above-mentioned pulse duration ends, and the second current peak value corresponds to a predetermined percentage of the first current peak value. The predetermined percentage may for example be 1/e, i.e., the second current peak value is approximately equal to 0.63 times the first current peak value.

Figure 3:
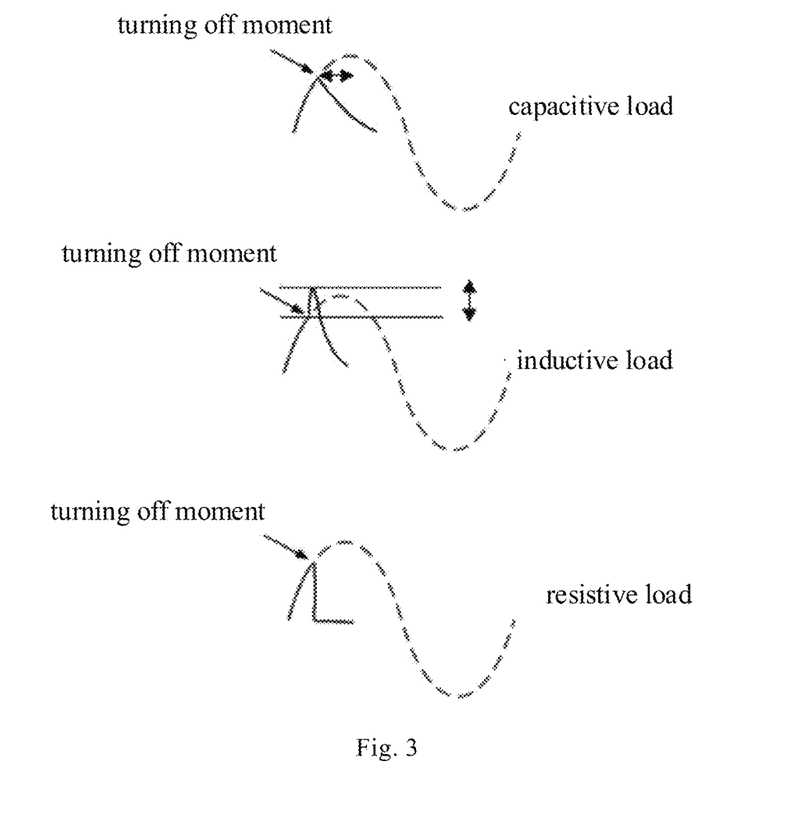
FIG. 3 shows example waveforms of a voltage at a load terminal when a load to which a solid-state circuit breaker is connected is an inductive load and a capacitive load, respectively.

Since the capacitive load has the characteristic of preventing the voltage across both ends thereof from changing, the voltage at the load terminal decays relatively slowly during discharge of the capacitive load, and relatively quickly during discharge of the inductive load and the resistive load. In addition, after the pulse duration ends, such that the solid-state switch 110 changes from the turning on to the turning off state, a spike voltage will occur across both ends of the inductive load due to the nature of the inductive load. FIG. 3 shows example waveforms of the voltage at the load terminal after the above pulse duration ends in cases where the load to which the solid-state circuit breaker is connected is an inductive load and a capacitive load, respectively. As a result, the control unit 140 can determine the type of the load to which the first terminal S1 is connected based on the above-described difference in decay speed of the voltage at the load terminal and the occurrence or absence of a spike voltage. Specifically, in one embodiment, after the above-described pulse duration ends, the control unit 140 may determine whether a spike voltage occurs at the first terminal S1. If it is determined that a spike voltage occurs at the first terminal S1, the control unit 140 may determine that the load to which the first terminal S1 of the solid-state switch 110 is connected is an inductive load. If it is determined that no spike voltage occurs at the first terminal S1, control unit 140 may determine that the load to which the first terminal S1 of the solid-state switch 110 is connected is a capacitive load or a resistive load. Furthermore, in one embodiment, the control unit 140 may calculate the first voltage decay time constant based on the voltage at the first terminal S1 and compare it to the first voltage decay time threshold. If the calculated first voltage decay time constant is greater than the first voltage decay time threshold, control unit 140 may determine that the load to which the first terminal S1 of the solid-state switch 110 is connected is a capacitive load. Conversely, if the calculated first voltage decay time constant is less than or equal to the first voltage decay time threshold, control unit 140 may determine that the load to which the first terminal S1 of the solid-state switch 110 is connected is a resistive load. The first voltage decay time threshold is a time threshold for distinguishing between the voltage decay time of a capacitive load and a resistive load, and may be a predetermined default value or input by a user. The first voltage decay time constant is a parameter characterizing how fast or slow the voltage at the first terminal S1 decays. In one embodiment, the first voltage decay time constant may be a time for a peak value of the voltage at the first terminal S1 to decay from a first voltage peak value to a second voltage peak value. The first voltage peak value corresponds to the maximum peak value of the voltage at the first terminal S1 after the above-mentioned pulse duration ends, and the second voltage peak value corresponds to a predetermined percentage of the first voltage peak value. The predetermined percentage may for example be 1/e, i.e., the second voltage peak is approximately equal to 0.63 times the first voltage peak.

It is discussed above how to determine the type of the load in the case where the solid-state switch 110 is turned off, the load terminal is not charged, and the power intake terminal is charged. Furthermore, if, as described above, the control unit 140 determines that the load terminal is charged in the case that the solid-state switch is turned off (i.e., as described above, the control unit may determine that the first terminal S1 is charged based on the current and/or voltage at the first terminal S1 measured by the first measurement unit 120), the control unit 140 may also proceed to determine the type of the load. Specifically, in one embodiment, in response to determining that the first terminal S1 is charged, the control unit 140 may determine whether the voltage at the first terminal S1 is a DC voltage or an AC voltage. If it is determined that the voltage at the first terminal S1 is an AC voltage, the control unit 140 may determine that the solid-state circuit breaker 100 is applied as a bus-tie switch (i.e., the above-mentioned power intake terminal and the load terminal of the solid-state circuit breaker are both connected to a bus bar) or is in a reverse intake powering state (i.e., the above-mentioned power intake terminal of the solid-state circuit breaker is connected to a load and the load terminal is connected to a power supply), and issue a prompt to the user. Furthermore, the control unit 140 may also distinguish between the bus-tie switch application and the reverse intake powering based on whether the second terminal S2 is charged or not, and issue a corresponding prompt to the user. If the second terminal S2 is charged, it can be determined that the solid-state circuit breaker 100 is applied as the bus-tie switch. If the second terminal S2 is not charged, the user is required to further determine whether the solid-state circuit breaker 100 is in the reverse intake powering state. If the solid-state circuit breaker 100 is applied as the bus-tie switch, the user may define both the above-mentioned power intake terminal and load terminal as intake terminals in the configuration of the solid-state circuit breaker 100. If the solid-state circuit breaker 100 is in the reverse intake powering state, the user may redefine the power intake terminal as the load terminal and the load terminal as the power intake terminal in the configuration of the solid-state circuit breaker 100. In addition, if it is determined that the voltage at the first terminal S1 is a DC voltage, the load to which the first terminal S1 is connected may be a capacitive load such as a charged capacitor, and it is necessary to further distinguish whether such a capacitive load is a common capacitor or a large capacitor/DC power supply. In the case it is a common capacitor, it will be fully discharged in a relatively short time, whereas in the case it is a large capacitor/DC power supply, it will be discharged in a relatively long time. Thus, control unit 140 may determine the type of the load to which the load terminal of the solid-state switch 110 is connected based on the decay speed of the voltage at the first terminal S1. In one embodiment, the control unit 140 may calculate a second voltage decay time constant based on the voltage at the first terminal S1 and compare it with a second voltage decay time threshold. If the calculated second voltage decay time constant is greater than the second voltage decay time threshold, control unit 140 may determine that the load to which the first terminal S1 of the solid-state switch 110 is connected is a large capacitor or a DC power supply. Conversely, if the calculated second voltage decay time constant is less than or equal to the second voltage decay time threshold, the control unit 140 may determine that the load to which the first terminal S1 of the solid-state switch 110 is connected is a capacitive load, i.e., the common capacitor described above. The second voltage decay time constant is a parameter characterizing how fast or slow the voltage at the first terminal S1 decays, and may for example be the time for the voltage at the first terminal S1 to decay from the current voltage value to a predetermined percentage of the current voltage value. The predetermined percentage may for example be 1/e, i.e. approximately equal to 0.63. The second voltage decay time threshold is a time threshold for distinguishing between the voltage decay time of a common capacitive load and a large capacitor/DC power supply, and may be a predetermined default value or input by a user.

Having determined the type of the load to which the first terminal S1 is connected, the solid-state circuit breaker may also employ different closing strategies for different load types, thereby alerting for potential safety risks and avoiding surge currents for capacitive loads and inrush currents for inductive loads. Thus, in one embodiment, upon receipt of a closing command by the solid-state circuit breaker 100, the control unit 140 may also determine a closing manner for the solid-state switch 110, i.e., determining whether to turn on the solid-state switch 110, the timing of the turning on of the solid-state switch 110, the closing angle, etc., based on the determined type of the load to which the first terminal S1 is connected.

For a capacitive load, the current-voltage relationship is i=C*dv/dt, where i represents the current, C represents the capacitance value, and dv/dt represents the speed of change of the voltage across the capacitive load. In order to avoid a large current i, it is necessary to make dv/dt as small as possible. Therefore, in the case that the capacitive load is initially powered (i.e. not charged), the circuit breaker should try to close the circuit breaker at a point where the voltage at the power intake terminal crosses zero, so as to avoid a large surge current caused by instantaneous changes in the voltage at the time of closing; and in the case that the capacitive load is powered again (i.e., charged), the circuit breaker should close when the voltage difference between the power intake terminal and the load terminal is close to zero, so as to avoid a large surge current caused by instantaneous changes in the voltage at the time of closing. Thus, in one embodiment, in the case where the load to which the first terminal S1 is connected is a capacitive load, control unit 140 may control the solid-state switch 110 to close at a point where the voltage at its second terminal S2 crosses zero if the first terminal S1 is not charged. If the first terminal S1 is charged, control unit 140 may control the solid-state switch 110 to close when the voltage at its first terminal S1 and the voltage at its second terminal S2 are equal.

For an inductive load, such as a transformer, the closing at the point of zero-crossing causes the core of the transformer to go into saturation, creating an inrush current. Therefore, for the inductive load, it is necessary to close at a closing angle greater than a closing angle threshold, which is greater than zero. The closing angle threshold may be a predetermined default value or input by a user. Furthermore, for the inductive load, different closing strategies need to be employed for motor-type inductive loads and transformer-type inductive loads. For motor-type inductive loads, the closing angle needs to be gradually increased to achieve a soft start function and avoid the transient surge current caused by a direct start. For transformer-type inductive loads, different closing angles and closing timings need to be selected depending on the type of solid-state circuit breaker, for example a two-stage solid-state circuit breaker (which is connected to single-phase alternating current) or a three-pole/four-pole solid-state circuit breaker (which is connected to three-phase alternating current). Thus, in one embodiment, in the case that the load to which the first terminal S1 is connected is an inductive load, the control unit 140 may determine whether the solid-state circuit breaker 100 is connected to a motor or connected to a transformer. For example, whether the solid-state circuit breaker 100 is connected to a motor or connected to a transformer may be determined based on relevant configuration parameters of the solid-state circuit breaker 100. In one embodiment, if it is determined that the solid-state circuit breaker 100 is connected to a motor, the control unit 140 may control the solid-state switch 110 to gradually increase the closing angle to perform a soft start. In one embodiment, if it is determined that the solid-state circuit breaker 100 is connected to a transformer, the control unit 140 may further determine whether the solid-state circuit breaker 100 is a two-pole solid-state circuit breaker or a three-pole/four-pole solid-state circuit breaker. If it is determined that the solid-state circuit breaker 100 is a two-pole solid-state circuit breaker, control unit 140 may control the solid-state switch 110 to close after the voltage at its second terminal S2 passes a peak value and at a closing angle ranging from 70 degrees to 80 degrees. If it is determined that the solid-state circuit breaker 100 is a three-pole/four-pole solid-state circuit breaker, the control unit 140 may control the solid-state switch 110 to close separately at different moments for the three phases of the alternating current. For a first phase (e.g. phase A) of the three phases described above, the control unit 140 may control the solid-state switch 110 to close firstly after the voltage at its second terminal S2 passes a peak value and at a closing angle ranging from 70 degrees to 80 degrees. For a second phase (e.g., phase B) and a third phase (e.g., phase C) of the three phases described above, the closing is performed after a phase shift of 60 degrees with respect to the phase voltage of the second phase.

Resistive loads have no special requirement for the closing strategy, and may adopt the same strategy as capacitive or inductive loads, or may adopt other strategies, such as direct closing in response to receiving a closing command.

If the load to which the first terminal S1 is connected is a large capacitor or a DC power supply as described above, it is a potential safety risk for the solid-state circuit breaker to close with the load charged. Thus, in one embodiment, the control unit 140 may control the solid-state switch 110 not to close if it is determined that the load to which the first terminal S1 is connected is a large capacitor or a DC power source.

The solid-state circuit breaker according to embodiments of the present disclosure may determine the type of a load to which it is connected. Based on the determined type of the load, it is further possible to avoid potentially improper applications and to select an appropriate closing strategy for different types of loads.

Figure 4:
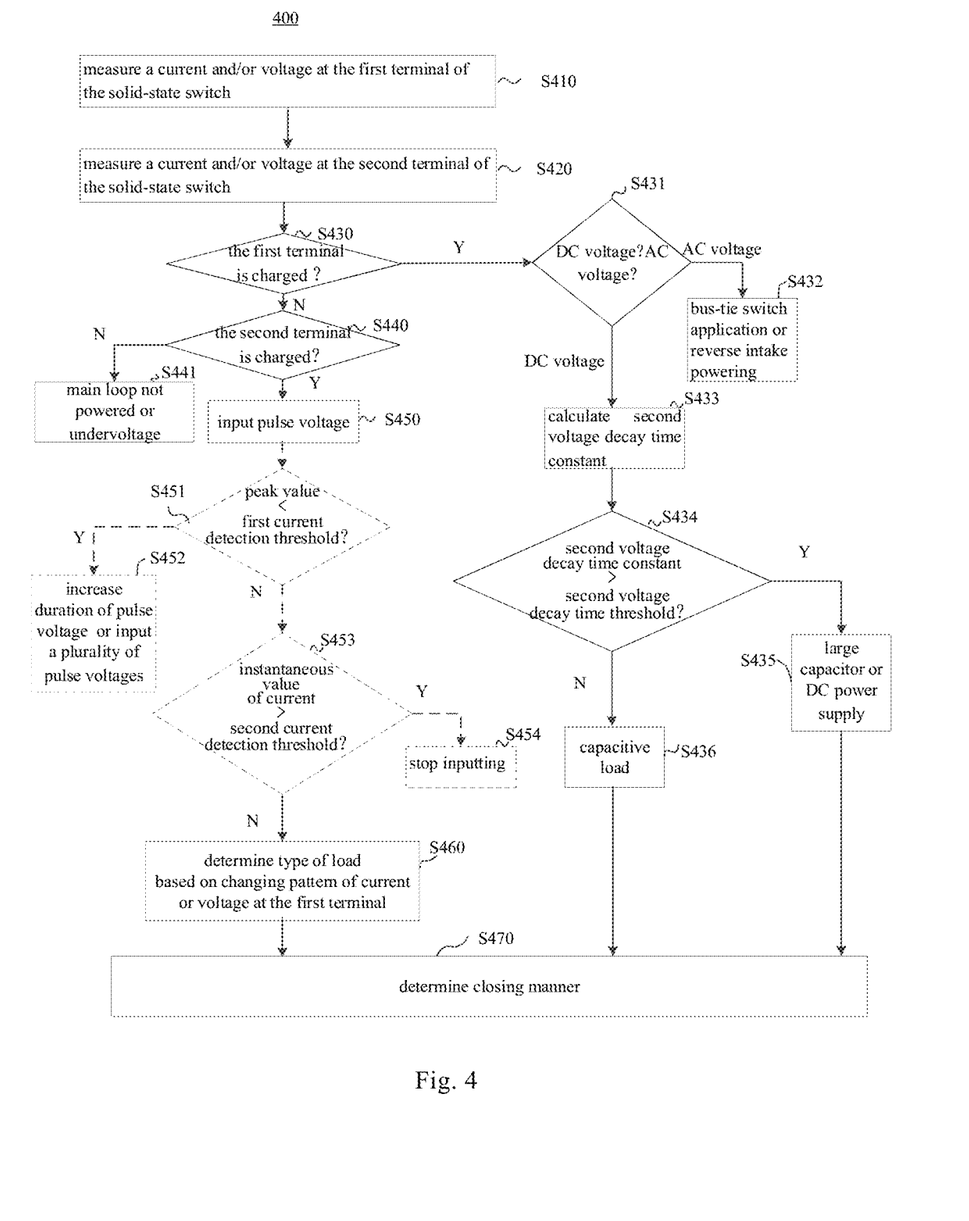
FIG. 4 is a flowchart of a control method of a solid-state circuit breaker according to an embodiment of the present disclosure.

FIG. 4 is a flowchart of a control method 400 of a solid-state circuit breaker according to an embodiment of the present disclosure. The solid-state circuit breaker may be, for example, the solid-state circuit breaker 100 described above in connection with FIG. 1. The solid-state circuit breaker comprises a solid-state switch, such as the solid-state switch 110 described above in connection with FIG. 1. The solid-state switch is connected at its first terminal to a load terminal of the solid-state circuit breaker and connected at its second terminal to a power intake terminal of the solid-state circuit breaker. The control method 400 is described in detail below.

Method 400 begins at step S410, where a current and/or voltage at the first terminal of the solid-state switch may be measured. At step S420, the current and/or voltage at the second terminal of the solid-state switch may be measured. Step S410 may be performed, for example, by the first measurement unit 120 described above, and step S420 may be performed, for example, by the second measurement unit 130 described above. It should be noted that although step S410 is described in FIG. 4 as being performed prior to step S420, in practice, steps S410 and S420 may be performed in parallel and continuously in real time.

At step S430, in the case that the solid-state switch is turned off, it may be determined whether the first terminal is charged based on the current and/or voltage at the first terminal. Step S430 may be performed, for example, by the control unit 140 described above. For example, whether the first terminal is charged may be determined based on a comparison of various statistical values capable of characterizing the current and/or voltage at the first terminal with a current and/or voltage threshold. These statistical values may be, for example, RMS values of the current and/or voltage, peak-to-peak values, and the like. In one embodiment, whether the first terminal is charged may be determined based on a RMS value of the voltage at the first terminal S1. Specifically, a first voltage RMS value may be calculated based on the measured voltage at the first terminal S1, and the calculated first voltage RMS value may be compared with a first voltage threshold. The first voltage threshold is a voltage threshold characterizing whether the first terminal is charged or not, and may be a predetermined default value or input by a user. If the calculated first voltage RMS value is less than the first voltage threshold, it may be determined that the first terminal is not charged; If the calculated first voltage RMS value is greater than or equal to the first voltage threshold, it may be determined that the first terminal S1 is charged.

At step S440, in response to determining that the first terminal is not charged, it may be determined whether the second terminal is charged based on the current and/or voltage at the second terminal. Step S440 may be performed, for example, by the control unit 140 described above. Whether the second terminal is charged or not may be determined in a manner similar to that described above for determining whether the first terminal is charged or not. For example, whether the second terminal is charged may be determined based on a comparison of various statistical values capable of characterizing the current and/or voltage at the second terminal with a current and/or voltage threshold. These statistical values may be, for example, RMS values of the current and/or voltage, peak-to-peak values, and the like. In one embodiment, whether the second terminal is charged may be determined based on a RMS value of the voltage at the second terminal. Specifically, a second voltage RMS value may be calculated based on the measured voltage at the second terminal, and the calculated second voltage RMS value may be compared with a second voltage threshold. The second voltage threshold is a voltage threshold characterizing whether the second terminal is charged or not, and may be a predetermined default value or input by a user. If the calculated second voltage RMS value is greater than the second voltage threshold, it may be determined that the second terminal is charged; If the calculated second voltage RMS value is less than or equal to the second voltage threshold, it may be determined that the second terminal is not charged. In a case where it is determined that the second terminal is not charged, it may be determined at step S441 by, for example, the control unit 140 described above that the main loop of the solid-state circuit breaker is not powered or in an undervoltage state, the control unit 140 may inform the user of this situation so that the user may take corresponding corrective measures.

At step S450, in response to determining that the second terminal is charged, a pulse voltage may be inputted to the control terminal of the solid-state switch to turn on the solid-state switch for a corresponding pulse duration. Step S450 may be performed, for example, by the driving unit 150 under control of the control unit 140 described above. In one embodiment, in order to avoid generating a large current or reverse voltage at the instant when the solid-state switch is turned on, which may damage the solid-state switch and the load, it is possible to start inputting the pulse voltage at a point where the voltage at the second terminal crosses zero. Furthermore, in one embodiment, in order to reduce the impact on the solid-state switch and the load, a turning on mode with "small pulse" is employed, e.g., the inputted pulse voltage is a short pulse voltage having a duration of less than 1 millisecond.

As described above, the current at the first terminal of the solid-state switch may be monitored during the turning on of the solid-state switch to ensure that the load to which the solid-state circuit breaker is connected is sufficiently charged during the pulse duration described above, so that the type of the load can subsequently be determined based on the discharge of the load, and the large current during the turning on of the solid-state switch that may damage the solid-state switch and the load are avoided. Thus, as shown with dashed lines in FIG. 4, between steps S450 and S460, optional steps S451 to S454 may also be included. At step S451, the peak value of the current at the first terminal of the solid-state switch is compared with a first current detection threshold. The first current detection threshold is a current threshold representative of a current value which can charge the load, during turning on of the solid-state switch, to a state such that the type of the load to which the first terminal is connected can be determined based on a changing pattern of the current or voltage at the first terminal following turning off of the solid-state switch, and may be a predetermined default value or input by a user. At step S452, in response to determining that the peak value of the current at the first terminal of the solid-state switch is less than the first current detection threshold, the duration of the above-described pulse voltage may be increased or a plurality of the above-described pulse voltages may be inputted. At step S453, the instantaneous value of the current at the first terminal during turning on of the solid-state switch may be compared with a second current detection threshold. The second current detection threshold is a current threshold that characterizes whether the instantaneous current at the load terminal is too large and thus may damage the solid-state switch and the load, and may be a predetermined default value or input by a user. At step S454, in response to the instantaneous value of the current at the first terminal of the solid-state switch being greater than the second current detection threshold, the inputting of the pulse voltage described above may be stopped. Steps S451 and S453 may be performed, for example, by the control unit 140 described above. Steps S452 and S454 may be performed, for example, by the driving unit 150 under control of the control unit 140 described above.

At step S460, a type of a load to which the first terminal of the solid-state switch is connected may be determined based on a changing pattern of the current at the first terminal or a changing pattern of the voltage at the first terminal after the pulse duration ends. Step S460 may be performed, for example, by the control unit 140 described above.

In one embodiment, determining the type of the load to which the first terminal of the solid-state switch is connected based on the changing pattern of the current at the first terminal may comprise: calculating a current decay time constant based on the current at the first terminal; and determining that the load to which the first terminal of the solid-state switch is connected is an inductive load in response to determining that the current decay time constant is greater than the current decay time threshold, and determining that the load to which the first terminal of the solid-state switch is connected is a capacitive load or a resistive load in response to determining that the current decay time constant is less than or equal to the current decay time threshold. The above-mentioned current decay time threshold is a time threshold for distinguishing between the current decay time of an inductive load and a capacitive/resistive load, and may be a predetermined default value or input by a user. The current decay time constant described above is a parameter that characterizes how fast or slow the current decays. In one embodiment, the current decay time constant may be the time for the peak value of the current at the first terminal to decay from a first current peak value to a second current peak value. The first current peak value corresponds to the maximum peak value of the current at the first terminal after the above-mentioned pulse duration ends, and the second current peak value corresponds to a predetermined percentage of the first current peak value. The predetermined percentage may for example be 1/e, i.e., the second current peak value is approximately equal to 0.63 times the first current peak value.

In one embodiment, determining the type of the load to which the first terminal of the solid-state switch is connected based on the changing pattern of the voltage at the first terminal may comprise: determining that the load to which the first terminal of the solid-state switch is connected is an inductive load in response to determining that a spike voltage occurs at the first terminal after the pulse duration ends, and determining that the load to which the first terminal of the solid-state switch is connected is a capacitive load or a resistive load in response to determining that no spike voltage occurs at the first terminal after the pulse duration ends. Furthermore, in one embodiment, the above-described determining that the load to which the first terminal of the solid-state switch is connected is a capacitive load or a resistive load may comprise: calculating the first voltage decay time constant based on the voltage at the first terminal; and determining that the load to which the first terminal of the solid-state switch is connected is a capacitive load in response to determining that the first voltage decay time constant is greater than the first voltage decay time threshold, and determining that the load to which the first terminal of the solid-state switch is connected is a resistive load in response to determining that the first voltage decay time constant is less than or equal to the first voltage decay time threshold. The first voltage decay time threshold is a time threshold for distinguishing between the voltage decay time of a capacitive load and a resistive load, and may be a predetermined default value or input by a user. The first voltage decay time constant is a parameter characterizing how fast or slow the voltage at the first terminal decays. In one embodiment, the first voltage decay time constant may be a time for a peak value of the voltage at the first terminal to decay from a first voltage peak value to a second voltage peak value. The first voltage peak value corresponds to a maximum peak value of the voltage at the first terminal after the above-mentioned pulse duration ends, and the second voltage peak value corresponds to a predetermined percentage of the first voltage peak value. The predetermined percentage may for example be 1/e, i.e., the second voltage peak is approximately equal to 0.63 times the first voltage peak.

It has been discussed above how to determine the type of a load with the solid-state switch being turned off, the first terminal being not charged, and the second terminal being charged. Furthermore, as shown in FIG. 4, the determination of the type of a load may also continue with the solid-state switch being turned off and the first terminal being charged. Specifically, in one embodiment, at step S431, in response to determining that the first terminal is charged, it may be determined whether the voltage at the first terminal is a DC voltage or an AC voltage. At step S432, in response to determining that the voltage at the first terminal is an AC voltage, it may be determined that the solid-state circuit breaker is applied as a bus-tie switch or is in a reverse intake powering state, and a prompt is issued to the user. Furthermore, it is also possible to distinguish between the bus-tie switch application and the reverse intake powering based on whether the second terminal is charged or not, and to issue a corresponding prompt to the user. If the second terminal is charged, it can be determined that the solid-state circuit breaker is applied as the bus-tie switch. If the second terminal is not charged, the user is required to further determine whether the solid-state circuit breaker is in the reverse intake powering state. If the solid-state circuit breaker is applied as the bus-tie switch, the user may define both the above-mentioned power intake terminal and load terminal as intake terminals in the configuration of the solid-state circuit breaker. If the solid-state circuit breaker is in the reverse intake powering state, the user may redefine the power intake terminal as the load terminal and the load terminal as the power intake terminal in the configuration of the solid-state circuit breaker. In addition, at step S433, in response to determining that the voltage at the first terminal is the DC voltage, a second voltage decay time constant may be calculated based on the voltage at the first terminal, the second voltage decay time constant is a time for the voltage at the first terminal to decay from the current voltage value to a predetermined percentage of the current voltage value. The second voltage decay time constant is a parameter characterizing how fast or slow the voltage at the first terminal decays, and may for example be the time for the voltage at the first terminal to decay from the current voltage value to a predetermined percentage of the current voltage value. The predetermined percentage may for example be 1/e, i.e. approximately equal to 0.63. At step S434, it may be determined whether the second voltage decay time constant is greater than a second voltage decay time threshold. The second voltage decay time threshold is a time threshold for distinguishing between the voltage decay time of a common capacitive load and a large capacitor/DC power supply, and may be a predetermined default value or input by a user. At step S435, in response to determining that the second voltage decay time constant is greater than the second voltage decay time threshold, it may be determined that the load to which the first terminal of the solid-state switch is connected is a large capacitor or DC power supply. At step S436, in response to determining that the second voltage decay time constant is less than or equal to the second voltage decay time threshold, it may be determined that the load to which the first terminal of the solid-state switch is connected is a capacitive load, i.e., a common capacitor. Steps S431-S436 may be performed, for example, by the control unit 140 described above.

Having determined the type of the load to which the first terminal of the solid-state switch is connected, the control method 400 may also select different closing strategies for the solid-state circuit breaker for different types of loads, thereby alerting safety risks and avoiding surge currents for capacitive loads and inrush currents for inductive loads. Accordingly, in one embodiment, as shown in FIG. 4, upon receipt of a closing command by the solid-state circuit breaker, the control method 400 may further comprise a step S470 in which a closing manner is determined for the solid-state switch, i.e. whether to turn on the solid-state switch, the timing of the turning on of the solid-state switch, the closing angle, etc., based on the determined type of the load to which the first terminal is connected. Step S470 may be performed, for example, by the control unit 140 described above.

In one embodiment, in the case that the load to which the first terminal is connected is a capacitive load, determining the closing manner for the solid-state switch may comprise: controlling the solid-state switch to close at a point where the voltage at its second terminal crosses zero in response to determining that the first terminal is not charged; and controlling the solid-state switch to close when the voltage at its first terminal and the voltage at its second terminal are equal in response to determining that the first terminal is charged.

In one embodiment, in the case that the load to which the first terminal is connected is an inductive load, determining the closing manner for the solid-state switch may comprise: controlling the solid-state switch to close at a closing angle greater than a closing angle threshold, which is greater than zero. The closing angle threshold may be a predetermined default value or input by a user. Furthermore, in one embodiment, in the case that the load to which the first terminal is connected is an inductive load, determining the closing manner for the solid-state switch may comprise: determining whether the solid-state circuit breaker is connected to a motor; and controlling the solid-state switch to gradually increase the closing angle in response to determining that the solid-state circuit breaker is connected to a motor. Alternatively, in one embodiment, in the case that the load to which the first terminal is connected is an inductive load, determining the closing manner for the solid-state switch may comprise: determining whether the solid-state circuit breaker is connected to a transformer; determining whether the solid-state circuit breaker is a two-pole solid-state circuit breaker or a three-pole/four-pole solid-state circuit breaker in response to determining that the solid-state circuit breaker is connected to a transformer; in response to determining that the solid-state circuit breaker is a two-pole solid-state circuit breaker, controlling the solid-state switch to close after the voltage at its second terminal passes a peak value and at a closing angle ranging from 70 degrees to 80 degrees; and in response to determining that the solid-state circuit breaker is a three-pole/four-pole solid-state circuit breaker, controlling the solid-state switch to close separately at different moments for the three phases of the alternating current. For a first phase (e.g. phase A) of the three phases described above, controlling the solid-state switch to close firstly after the voltage at its second terminal passes a peak value and at a closing angle ranging from 70 degrees to 80 degrees. For a second phase (e.g., phase B) and a third phase (e.g., phase C) of the three phases described above, the closing is performed after a phase shift of 60 degrees with respect to the phase voltage of the second phase.

In one embodiment, in the case that the load to which the first terminal is connected is a large capacitor or a DC power supply, determining the closing manner for the solid-state switch may comprise controlling the solid-state switch not to close.

The control method of the solid-state circuit breaker according to embodiments of the present disclosure may determine a type of a load to which the solid-state circuit breaker is connected. Based on the determined type of the load, it is further possible to avoid potentially improper applications and to select an appropriate closing strategy for different types of loads.

It should be noted that while the various steps are described above in a particular order, this should not be construed as requiring that the steps be performed in the particular order or sequence described. For example, the steps S410 and S420 described above may be performed in parallel and continuously, the execution of the steps S440 to S460 described above is independent of the execution of the steps S431 to S436, and so on.

The block diagrams of apparatus, devices and systems involved in the present disclosure are merely exemplary and are not intended to require or imply that the connections, arrangements, configurations must be made in the manner shown in the block diagrams. As will be appreciated by those skilled in the art, these circuits, devices, apparatus, devices and systems may be connected, arranged, configured in any way as long as the desired purpose is achieved.

The processes and logic flows described in this specification can be performed by one or more programmable processors executing one or more computer programs to perform functions by operating on input data and generating output. The processes and logic flows can also be performed by, and apparatus can also be implemented as, a dedicated logic circuit, e.g., a field programmable gate array (FPGA) or an application specific integrated circuit (ASIC).

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Certain features that are described in this specification in the context of separate embodiments can also be combined. Conversely, various features that are described in the context of separate embodiments can also be implemented in multiple embodiments separately or in any suitable sub-combination.

It should be understood by those skilled in the art that the above-described specific embodiments are only examples but not limitations, and various modifications, combinations, partial combinations and substitutions may be made to the embodiments of the present disclosure according to design requirements and other factors as long as they are within the scope of the appended claims or the equivalent thereof, i.e., the scope to be protected by the present disclosure.

The invention claimed is:

1. A solid-state circuit breaker comprising a solid-state switch, a first measurement unit, a second measurement unit, a control unit and a driving unit, wherein
the solid-state switch is connected between a power intake terminal of the solid-state circuit breaker and a load terminal of the solid-state circuit breaker, wherein a first terminal of the solid-state switch is connected to the load terminal and the first measurement unit, a second terminal of the solid-state switch is connected to the power intake terminal and the second measurement unit, a control terminal of the solid-state switch is connected to the driving unit;
the first measurement unit is configured to measure a current and/or a voltage at a first terminal of the solid-state switch;
the second measurement unit is configured to measure a current and/or a voltage at a second terminal of the solid-state switch;
the control unit is configured to:
determine whether the first terminal is charged based on the current and/or voltage at the first terminal in a case that the solid-state switch is turned off;
determine whether the second terminal is charged based on the current and/or voltage at the second terminal in response to determining that the first terminal is not charged;
control the driving unit to input a pulse voltage to a control terminal of the solid-state switch to turn on the solid-state switch for a corresponding pulse duration in response to determining that the second terminal is charged;
determine a type of a load to which the first terminal of the solid-state switch is connected based on a changing pattern of the current at the first terminal or a changing pattern of the voltage at the first terminal after the pulse duration ends.

2. The solid-state circuit breaker of claim 1, wherein determining the type of the load to which the first terminal of the solid-state switch is connected based on the changing pattern of the current at the first terminal comprises:
calculating a current decay time constant based on the current at the first terminal; and
determining that the load to which the first terminal of the solid-state switch is connected is an inductive load in response to determining that the current decay time constant is greater than a current decay time threshold, and determining that the load to which the first terminal of the solid-state switch is connected is a capacitive load or a resistive load in response to determining that the current decay time constant is less than or equal to the current decay time threshold.

3. The solid-state circuit breaker of claim 2, wherein the current decay time constant is a time for a peak value of the current at the first terminal to decay from a first current peak value to a second current peak value, the first current peak value corresponds to the maximum peak value of the current at the first terminal after the pulse duration ends, and the second current peak value corresponds to a predetermined percentage of the first current peak value.

4. The solid-state circuit breaker of claim 1, wherein determining the type of the load to which the first terminal of the solid-state switch is connected based on the changing pattern of the voltage at the first terminal comprises:
    determining that the load to which the first terminal of the solid-state switch is connected is an inductive load in response to determining that a spike voltage occurs at the first terminal after the pulse duration ends; and
    determining that the load to which the first terminal of the solid-state switch is connected is a capacitive load or a resistive load in response to determining that no spike voltage occurs at the first terminal after the pulse duration ends.

5. The solid-state circuit breaker of claim 4, wherein determining that the load to which the first terminal of the solid-state switch is connected is a capacitive load or a resistive load comprises:
    calculating a first voltage decay time constant based on the voltage at the first terminal; and
    determining that the load to which the first terminal of the solid-state switch is connected is a capacitive load in response to determining that the first voltage decay time constant is greater than a first voltage decay time threshold, and determining that the load to which the first terminal of the solid-state switch is connected is a resistive load in response to determining that the first voltage decay time constant is less than or equal to the first voltage decay time threshold.

6. The solid-state circuit breaker of claim 5, wherein the first voltage decay time constant is a time for a peak value of the voltage at the first terminal to decay from a first voltage peak value to a second voltage peak value, the first voltage peak value corresponds to a maximum peak value of the voltage at the first terminal after the pulse duration ends, and the second voltage peak value corresponds to a predetermined percentage of the first voltage peak value.

7. The solid-state circuit breaker of claim 1, wherein determining whether the first terminal is charged based on the voltage at the first terminal comprises:
    calculating a first voltage root mean square (RMS) value based on the voltage at the first terminal; and
    determining that the first terminal is not charged in response to determining that the first voltage RMS value is less than a first voltage threshold; and
    determining that the first terminal is charged in response to determining that the first voltage RMS value is greater than or equal to the first voltage threshold.

8. The solid-state circuit breaker of claim 1, wherein determining whether the second terminal is charged based on the voltage at the second terminal comprises:
    calculating a second voltage root mean square (RMS) value based on the voltage at the second terminal; and
    determining that the second terminal is charged in response to determining that the second voltage RMS value is greater than a second voltage threshold; and
    determining that the second terminal is not charged in response to determining that the second voltage RMS value is less than or equal to the second voltage threshold.

9. The solid-state circuit breaker of claim 1, wherein the control unit is further configured to:
    determine whether the voltage at the first terminal is a DC voltage or an AC voltage in response to determining that the first terminal is charged;
    determine that the solid-state circuit breaker is applied as a bus-tie switch or is in a reverse intake powering state in response to determining that the voltage at the first terminal is the AC voltage, and issue a prompt to a user;
    calculate a second voltage decay time constant based on the voltage at the first terminal in response to determining that the voltage at the first terminal is the DC voltage, wherein the second voltage decay time constant is a time for the voltage at the first terminal to decay from a current voltage value to a predetermined percentage of the current voltage value; and
    determine that the load to which the first terminal of the solid-state switch is connected is a large capacitor or a DC power supply in response to determining that the second voltage decay time constant is greater than a second voltage decay time threshold, and determine that the load to which the first terminal of the solid-state switch is connected is a capacitive load in response to determining that the second voltage decay time constant is less than or equal to the second voltage decay time threshold.

10. The solid-state circuit breaker of claim 1, wherein controlling the driving unit to input the pulse voltage to the control terminal of the solid-state switch comprises controlling the driving unit to start inputting the pulse voltage at a point where the voltage at the second terminal crosses zero.

11. The solid-state circuit breaker of claim 1, wherein the pulse voltage comprises a short pulse voltage having a duration of less than 1 millisecond.

12. The solid-state circuit breaker of claim 1, wherein, during turning on of the solid-state switch, the control unit is further configured to:
    control the driving unit to increase a duration of the pulse voltage or to input a plurality of the pulse voltages in response to determining that a peak value of the current at the first terminal of the solid-state switch is less than a first current detection threshold; and
    control the driving unit to stop inputting the pulse voltage in response to determining that the instantaneous value of the current at the first terminal of the solid-state switch is greater than a second current detection threshold.

13. The solid-state circuit breaker of claim 1, wherein upon receipt of a closing command by the solid-state circuit breaker, the control unit is further configured to determine a closing manner for the solid-state switch based on the determined type of the load to which the first terminal is connected.

14. The solid-state circuit breaker of claim 13, wherein determining the closing manner for the solid-state switch comprises:
    in a case that the load to which the first terminal is connected is a capacitive load:

controlling the solid-state switch to close at a point where the voltage at its second terminal S2 crosses zero in response to determining that the first terminal is not charged; and controlling the solid-state switch to close when the voltage at its first terminal and the voltage at its second terminal are equal in response to determining that the first terminal is charged, in a case that the load to which the first terminal is connected is an inductive load:

controlling the solid-state switch to close at a closing angle greater than a closing angle threshold, the closing angle threshold being greater than zero.

15. The solid-state circuit breaker of claim 14, wherein in a case that the load to which the first terminal is connected is an inductive load, determining the closing manner for the solid-state switch comprises:

determining whether the solid-state circuit breaker is connected to a motor; and controlling the solid-state switch to gradually increase the closing angle in response to determining that the solid-state circuit breaker is connected to a motor.

16. The solid-state circuit breaker of claim 14, wherein in a case that the load to which the first terminal is connected is an inductive load, determining the closing manner for the solid-state switch comprises:

determining whether the solid-state circuit breaker is connected to a transformer;

determining whether the solid-state circuit breaker is a two-pole solid-state circuit breaker or a three-pole/four-pole solid-state circuit breaker in response to determining that the solid-state circuit breaker is connected to a transformer;

in response to determining that the solid-state circuit breaker is the two-pole solid-state circuit breaker, controlling the solid-state switch to close after the voltage at its second terminal passes a peak value and at a closing angle ranging from 70 degrees to 80 degrees; and in response to determining that the solid-state circuit breaker is the three-pole/four-pole solid-state circuit breaker, controlling the solid-state switch to close separately at different moments for three phases of the alternating current, wherein for a first phase of the three phases, the solid-state switch is controlled to close firstly after the voltage at its second terminal passes a peak value and at a closing angle ranging from 70 degrees to 80 degrees; and for a second phase and a third phase of the three phases, the closing is performed after a phase shift of 60 degrees with respect to a phase voltage of the second phase.

17. The solid-state circuit breaker of claim 14, wherein in a case that the load to which the first terminal is connected is a large capacitor or a DC power supply, determining the closing manner for the solid-state switch comprises:

controlling the solid-state switch not to close.

18. A control method of a solid-state circuit breaker, the solid-state circuit breaker comprising a solid-state switch connected at a first terminal thereof to a load terminal of the solid-state circuit breaker and connected at a second terminal thereof to a power intake terminal of the solid-state circuit breaker, the control method comprising:

measuring a current and/or voltage of a first terminal of the solid-state switch;

measuring a current and/or voltage of a second terminal of the solid-state switch;

determining whether the first terminal is charged based on the current and/or voltage at the first terminal in a case that the solid-state switch is turned off;

determining whether the second terminal is charged based on the current and/or voltage at the second terminal in response to determining that the first terminal is not charged;

inputting a pulse voltage to a control terminal of the solid-state switch to turn on the solid-state switch for a corresponding pulse duration in response to determining that the second terminal is charged;

determining a type of a load to which the first terminal of the solid-state switch is connected based on a changing pattern of the current at the first terminal or a changing pattern of the voltage at the first terminal after the pulse duration ends.

19. The control method of claim 18, wherein determining the type of the load to which the first terminal of the solid-state switch is connected based on the changing pattern of the current at the first terminal comprises:

calculating a current decay time constant based on the current at the first terminal; and determining that the load to which the first terminal of the solid-state switch is connected is an inductive load in response to determining that the current decay time constant is greater than a current decay time threshold, and determining that the load to which the first terminal of the solid-state switch is connected is a capacitive load or a resistive load in response to determining that the current decay time constant is less than or equal to the current decay time threshold.

20. The control method of claim 18, wherein determining the type of the load to which the first terminal of the solid-state switch is connected based on the change pattern of the voltage at the first terminal comprises:

determining that the load to which the first terminal of the solid-state switch is connected is an inductive load in response to determining that a spike voltage occurs at the first terminal after the pulse duration ends; and determining that the load to which the first terminal of the solid-state switch is connected is a capacitive load or a resistive load in response to determining that no spike voltage occurs at the first terminal after the pulse duration ends.

* * * * *